United States Patent [19]

Sheppard

[11] 4,111,395

[45] Sep. 5, 1978

[54] BUTTERFLY VALVE

[75] Inventor: William L. Sheppard, Romulus, Mich.

[73] Assignee: AVM Corporation, Jamestown, N.Y.

[21] Appl. No.: 661,132

[22] Filed: Feb. 25, 1976

Related U.S. Application Data

[63] Continuation of Ser. No. 490,232, Jul. 22, 1974, abandoned.

[51] Int. Cl.² .............................................. F16K 1/22
[52] U.S. Cl. ........................................ 251/306; 251/208; 251/308; 251/314; 251/367
[58] Field of Search ............. 251/80, 79, 77, 61, 251/208, 304–308, 314, 316, 317, 356, 357, 360, 362, 228, 58, 59, 367; 261/39 C

[56] References Cited

U.S. PATENT DOCUMENTS

| | | | |
|---|---|---|---|
| 2,011,641 | 8/1935 | Kruse | 251/305 |
| 2,315,775 | 4/1943 | D'Arcey | 251/58 |
| 3,100,500 | 8/1963 | Stillwagon | 251/306 |
| 3,143,132 | 8/1964 | Pangburn | 251/306 |
| 3,173,650 | 3/1965 | Cotterman et al. | 251/306 |
| 3,215,400 | 11/1965 | Muller | 251/306 |
| 3,233,861 | 2/1966 | Stillwagon | 251/306 |
| 3,241,806 | 3/1966 | Snell, Jr. | 251/306 |
| 3,262,683 | 7/1966 | Ball et al. | 261/39 C |
| 3,298,677 | 1/1967 | Anderson | 251/208 |
| 3,321,194 | 5/1967 | Carlson | 261/39 C |
| 3,475,007 | 10/1969 | Fawkes | 251/305 |
| 3,565,394 | 2/1971 | Smith | 251/306 |
| 3,568,975 | 3/1971 | Obermaier | 251/306 |
| 3,642,247 | 2/1972 | Scaramucci | 251/308 |
| 3,675,681 | 7/1972 | Obermaier | 251/305 |
| 3,857,406 | 12/1974 | Dorling | 251/306 |

Primary Examiner—Martin P. Schwadron
Assistant Examiner—G. L. Walton
Attorney, Agent, or Firm—Harness, Dickey & Pierce

[57] ABSTRACT

There is disclosed a butterfly-type valve cooperable with a valve seat element formed of an elastomeric material, wherein this element also forms a seal between two identical housing halves. There is also disclosed an improved method of making such a valve, as well as a vacuum motor for actuating the valve which incorporates a linkage mechanism having force limiting means to prevent the application of excessive forces to this valve.

14 Claims, 14 Drawing Figures

BUTTERFLY VALVE

This is a continuation, of application Ser. No. 490,232, filed July 22, 1974 now abandoned.

BACKGROUND AND SUMMARY OF THE INVENTION

The present invention relates to an improved butterfly-type valve and actuating means which, although suitable for use in many fluid valving applications, is particularly suited for use as an on-off valve for the engine coolant supply to an automobile heater.

Valves for such an application must be very inexpensive to manufacture and assemble, must operate to provide a reliable seal in the adverse environment found in the engine compartment of an automobile, must reliably seal a liquid which may be loaded with core sand and other impurities, and must be small and lightweight. Although a butterfly-valve has been used for such an application it incorporates a rubber covered pivotal valve element operable within a rigid housing, and has been found to be relatively expensive and difficult to fabricate and assemble. The following is a list of all the patents which applicant has seen in connection with the development of the present valve:

U.S. Pat. Nos. 1,588,445,—3,029,063, 1,744,798, 3,048,191, 2,059,687, 3,442,488, 2,296,213, 3,568,975, 2,772,850, 3,666,235, 2,923,523, 3,675,681.

It is therefore a primary object of the present invention to provide an improved butterfly-type valve having the aforesaid desirable characteristics and which obviates the disadvantages of known valves.

It is an object of this invention to provide an improved valve utilizing relatively few different parts formed simply of inexpensive materials, using common parts to reduce tooling and inventory costs, having its operating parts floating in or mounted to an elastomeric member to reduce the number and degree of critical tolerances, utilizing a single elastomeric member to provide the dual functions of valve seat and body seal, and incorporating easy to assemble components, whereby fabrication and assembly costs are minimized.

It is an object of this invention to provide an improved valve which is balanced so that it seals equally well against both positive and negative pressures and which utilizes a resilient seat which is washed by the valved fluid to minimize the adverse effects of foreign matter in the fluid, whereby a reliable leakproof valve seal is achieved. A related object resides in the provision of such a valve which by virtue of its balanced nature requires a relatively low opening force.

It is an object of this invention to provide an improved force transmitting linkage for a valve which incorporates force controlling means for preventing over-closing of the valve, whereby a relatively uniform loading of the valve is achieved, a lighter weight, more friction-free actuating shaft may be used, and the need for critical manufacturing tolerances is obviated.

It is an object of this invention to provide an improved technique for affixing an actuating shaft to a butterfly valve element.

It is an object of this invention to provide an improved method of fabricating and assembling a butterfly-type valve.

These and other objects of the invention will become apparent from the following description and the appended claims, taken in conjunction with the accompanying drawings.

DETAILED DESCRIPTION OF THE PREFERRED EMBODIMENT

Although the valve assembly of the present invention is suited for many different applications, handling virtually any desired fluid, it will be disclosed herein for exemplary purposes embodied in a valve and vacuum motor assembly particularly suited for use as a water heater valve for automobiles. The overall assembly comprises a valve 10, a vacuum motor 12 and an interconnecting linkage mechanism 14.

Valve 10 comprises basically a first body member 16, a second body member 18 identical to member 16, a valve seat element 20, a valve plate 22 fixedly connected to a rotatable actuating shaft 24, and a clinch ring 26 which holds body members 16 and 18 together. The valve thus has only five different basic parts.

Figure 3:
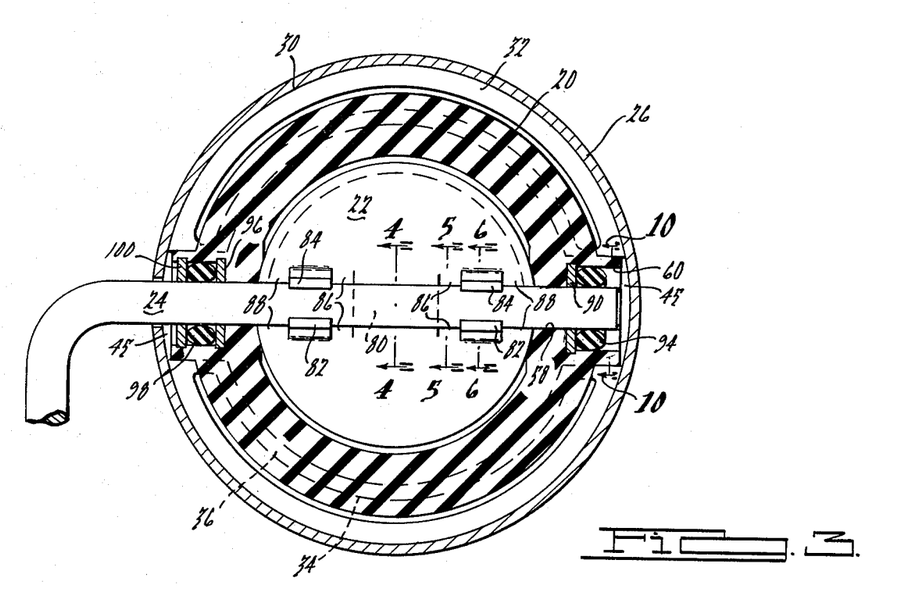
FIG. 3 is a transverse sectional view of the valve of the present invention taken generally along line 3—3 in FIG. 1.

Body members 16 and 18 are identical to one another and therefore the details thereof will be described only in connection with member 16, it being borne in mind that the same reference numerals will refer to like portions of member 18. Body member 16 is generally tubular in configuration having a central passageway 28 for the flow of fluid controlled by the valve, a hose nipple 30 at the axially outer end, and an enlarged axially inner end comprising an outer annular flange 30 having an annular end surface 32 disposed in a single plane extending transversely to the longitudinal axis of passageway 28 and the valve, an inner annular flange 34 having an annular end surface 36 lying in a single plane disposed transversely to the longitudinal axis of the valve and spaced slightly outwardly from the plane of surface 32, and an outwardly extending annular groove disposed between flange 34 and the adjacent wall of passageway 28, said groove comprising a generally cylindrical outer wall 40, a generally outwardly flared conical inner wall 42 and an annular inter-connecting bottom wall 44. At each of the diametrically opposite sides of the inner end of the body member there is a wall portion defining a groove 45 of semi-circular cross-section, each groove 45 having its axis lying on the same major diameter of the body member, as best seen in FIG. 3. Body member 16, which is generally circular in cross-sectional configuration, is preferably molded in one piece out of a suitable plastic, such as nylon. Since body members 16 and 18 are identical they may be formed out of the same molds, thus reducing the number of different parts of which the valve is comprised and providing the benefits normally derived from the use of common parts.

Figures 7, 14:
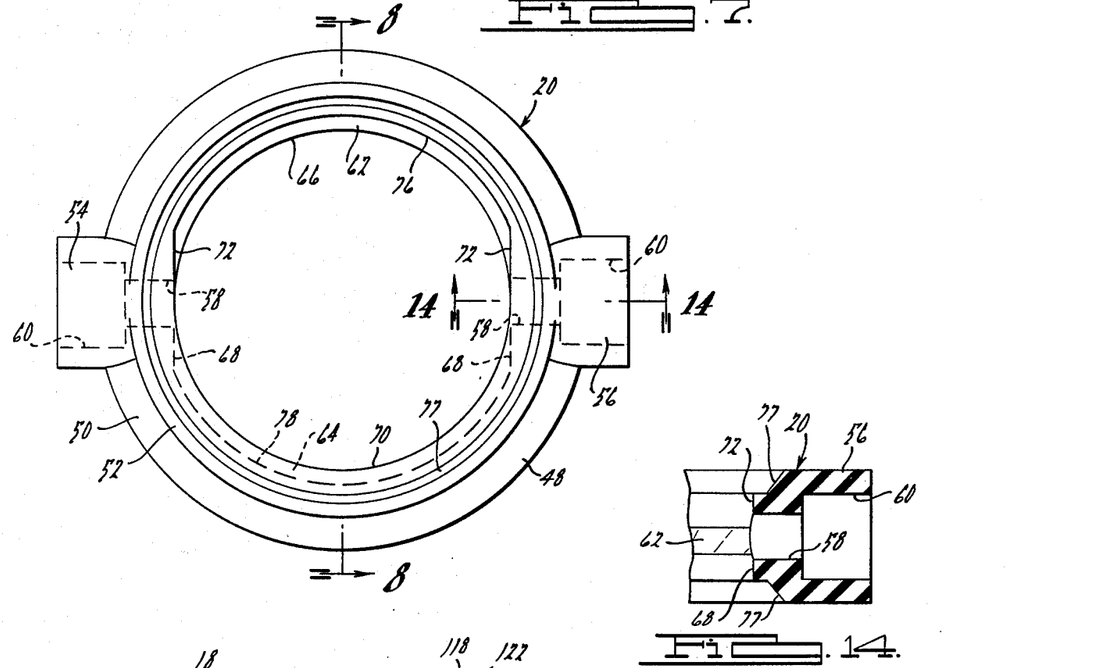
FIG. 7 is a plan view of the valve seat element of the present invention.
FIG. 14 is a sectional view taken along line 14—14 in FIG. 7.
Figure 8:
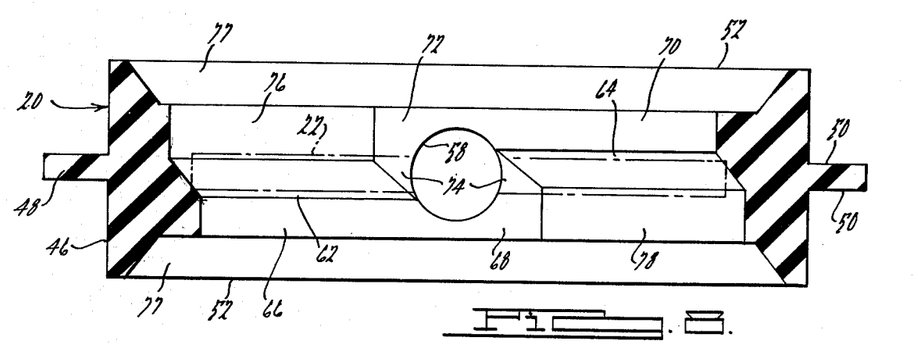
FIG. 8 is a sectional view taken along line 8—8 in FIG. 7.

Valve seat element 20, best illustrated in FIGS. 7, 8 and 14, is preferably molded in one piece from an elastomeric material such as high-temperature Buna-N, and as can be seen is generally annular in configuration comprising a generally cylindrical outer wall 46 from which centrally projects an annular flange 48 having generally parallel faces 50 lying substantially in planes disposed generally transversely with respect to the central axis thereof, which is the longitudinal axis of the valve when assembled. The axially outer end faces of element 20, indicated at 52, also lie generally in parallel planes disposed generally transversely to the same axis. Element 20 is also provided with diametrically oppositely disposed generally circular radially outwardly extending integral bosses 54 and 56 each having a through-passageway 58 terminating in a generally cylindrical enlarged open counter-bore 60. Element 20 is generally circular in plan and in the embodiment illustrated has the axis of passageways 58 and counterbores 60 passing through the center of the element, i.e. on a common major diameter.

The inner surface of element 20 comprises on one side of the axis of passageways 58 a conical valve seat 62 and on the opposite side of the axis a conical valve seat 64 facing in the opposite direction as valve seat 62. Element 20 is completely symmetrical about the axis of passageways 58 and therefore FIG. 7 could represent either the top view or the bottom view thereof. Consequently, valve seats 62 and 64 are fully identical with respect to one another, each extending for slightly less than 180° about the inner periphery of element 20. The reason that the conical valve seats do not extend a full 180° is because of the presence of passageway 58 and the need for providing a sealing function thereat. Thus, as can be seen best in FIGS. 7, 8 and 14, the radially inner edge of valve seat 62 terminates at a generally cylindrical wall portion 66 which is coaxial with most of valve seat 62 but which in the vicinity of passageway 58 blends into a substantially flat surface 68 lying substantially in a plane disposed transversely to the axis of passageways 58. This configuration is identical at both ends of wall portion 66. Similarly, valve seat 64 terminates at its radially inner edge at a generally cylindrical wall portion 70 which is coaxial with valve seat 64 throughout most of its extent but at which each end thereof blends into a generally flat surface 72 in the vicinity of each of the passageways 58, exactly in the same manner as does wall portion 66. Furthermore, flat surfaces 68 and 72 lie in the same plane and are connected by similarly substantially coplanar flat surfaces 74 in the vicinity of each passageway 58 (FIGS. 8 and 14). As can be seen, the distance between the respective planes of surfaces 68, 72 and 74 on one side of element 20 and the same surfaces on the opposite side of element 20 is less than the corresponding diameter of valve plate 22. The radially outer edges of valve surfaces 62 and 64 terminate at generally cylindrical clearance walls 76 and 78, respectively. The inside of the axial ends of element 20 are counterbored and chamfered, as at 77, preferably at an included angle greater than the included angle of conical walls 42. Because of the inherent resilience of element 20 and the manner in which it is mounted and operates, its dimensions are not particularly critical.

Disposed within and supported by element 20 is the valve plate assembly including valve plate 22 and its actuating shaft 24. As best seen in FIG. 3, valve plate 22 is generally circular in configuration and is located concentrically with respect to valve seats 62 and 64 so that when rotated to a closed position, i.e. one in which it is generally transverse to the longitudinal axis of the valve (FIG. 1), the opposite edges of the valve plate 22 will sealingly engage valve seats 62 and 64, respectively. This relationship is best shown in FIG. 8 where valve plate 22 is illustrated in phantom. Valve plate 22 may be formed of metal, or any other suitable material which is relatively rigid with respect to element 20, and has substantially parallel faces and relatively square edges to provide relatively sharp corners for sealingly engaging the elastomeric valve seats. The diameter of valve plate 22 is preferably greater than the minimum diameter of seats 62 and 64, and is also greater than the distance between surfaces 68 on each side of the element. It is less than the diameter of surfaces 76 and 78.

Figure 4:
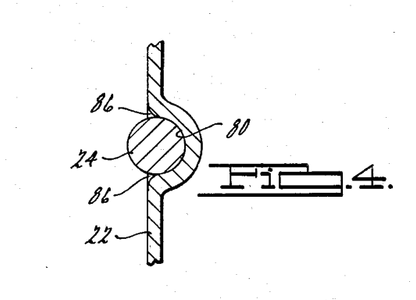
FIG. 4 is a sectional view taken along line 4—4 in FIG. 3.
Figures 5, 6:
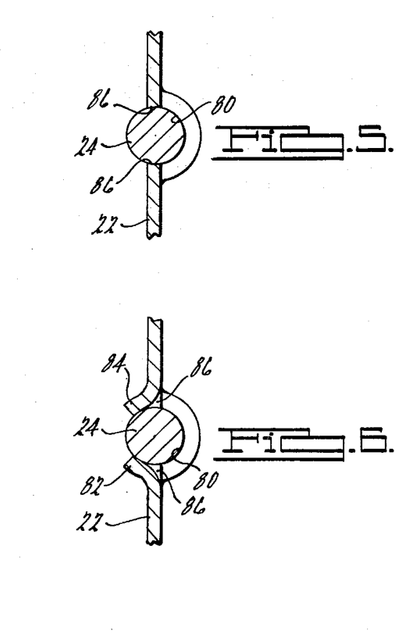
FIG. 5 is a sectional view taken along line 5—5 in FIG. 3.
FIG. 6 is a sectional view taken along line 6—6 in FIG. 3.

Valve plate 22 is affixed to shaft 24 in a unique manner best illustrated in FIGS. 3 through 6. Generally speaking, the center portion of valve plate 22 is formed with a U-shaped section lying substantially on a major diameter of the element and defining a groove 80 having the contour of the outer surface of shaft 24, which is circular in the embodiment illustrated. Groove 80 is so dimensioned and positioned so that the center of shaft 24 lies in a plane disposed equidistant between the faces of valve plate 22. In order to anchor the valve plate to the shaft during assembly, valve plate 22 additionally has two pairs of struck-out portions each comprising a projection 82 extending partially around shaft 24 in one direction and a projection 84 extending partially around the shaft in the opposite direction. By extending only partially around the shaft they are easier to manufacture. Projections 82 and 84 all project integrally from valve plate 22 in the opposite direction as does the U-shaped portion defining groove 80, as best seen in FIG. 6.

A significant feature of applicant's arrangement is that adjacent each of the portions of the valve plate which are formed or struck-out of the plane thereof there is provided an integral portion of the valve plate which lies in the plane thereof. For example, between each pair of projections 82, 84 and groove 80 there are disposed a pair of projections 86 lying in the plane of valve plate 22, and similarly the portion of valve plate 22 disposed outwardly from each pair of projections 82, 84 is cut away to accommodate the shaft and thereby define projections 88 lying in the plane of the valve plate. As best seen in FIGS. 4 through 6, the purpose of these projections is to substantially close the interstices which would otherwise exist in the assembly of the shaft and plate by virtue of the struck-out portions and projections utilized to retain the two together during assembly. It is a significant feature because it permits the parts to be brazed or soldered together in such a way that all of the relatively small interstices which may remain can be completely filled with the brazing or soldering material to thereby render the shaft and valve plate assembly totally leakproof. In the absence of the projections lying in the plane of the valve plate the interstices might be so large that they would not be filled by the brazing or soldering material and thus the resultant valve might leak.

Figure 10:
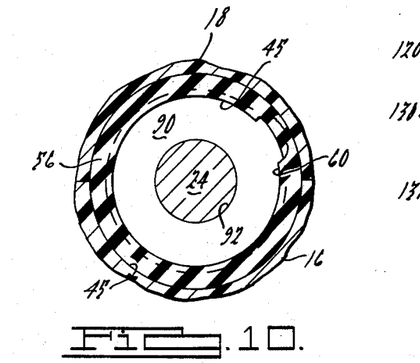
FIG. 10 is a fragmentary sectional view taken along line 10—10 in FIG. 3 with an O-ring removed for clarity.

In the preferred embodiment, shaft 24 is journalled in valve seat element 20 in the manner best illustrated in FIGS. 3 and 10. As illustrated in FIG. 3, one end of shaft 24 extends just slightly beyond valve plate 22 where it terminates in a journalling portion extending through passageway 58 into counterbore 60. Disposed at the bottom of counterbore 60 is a washer 90 formed of a rigid material such as metal or the like having a centrally disposed through-opening 92 in which is rotatably disposed shaft 24. Sufficient clearance is provided between opening 92 and shaft 24 to eliminate the likelihood of any binding occurring between the two parts. The outside diameter of washer 90 is preferably slightly greater than the relaxed inside diameter of counterbore 60 so that upon assembly of the valve washer 90 will be compressably retained in the counterbore, as best seen in FIG. 10 where it is actually shown embedded in the elastomeric material of which element 20 is formed. A seal is provided between shaft 24 and element 20 by means of a conventional O-ring 94 disposed in counterbore 60 (O-ring 94 is removed in FIG. 10 to improve clarity).

Figure 11:
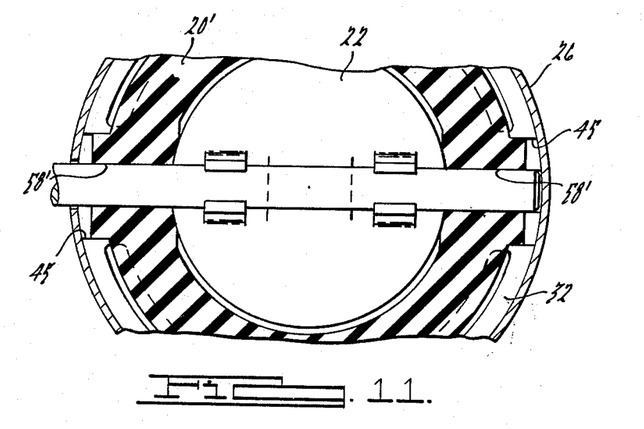
FIG. 11 is a view similar to that of FIG. 3 but illustrating a modification of the present invention.

The opposite portion of shaft 24 extends through the counterbore in the boss on element 20 on the opposite side thereof and is similarly journalled by means of a washer 96, with the seal between the shaft and the valve seat element being provided by an O-ring 98. Because actuating shaft 24 extends as a crank from this point to a point outside the valve where it is connected to a source of power, there is a tendency for over-turning moments to occur at the journal provided by washer 96. Accordingly, to strengthen the journal or bearing of the shaft at this point there may be provided a second washer 100 disposed outside of O-ring 98, both washers being retained in exactly the same manner as washer 90. Washers 90 and 96 also serve to prevent flat surfaces 68 and 72 on element 20 from ballooning out under pressure. In other applications the loads on the valve element may be such that no special bearings or journals are required, in which case the valve seat element may merely be provided with through-passageways 58' (no counterbores) at each side in which shaft 24 is rotatably disposed, as shown in FIG. 11 where the seat element is indicated at 20'. Passageways 58 and 58' are preferably of a diameter just slightly less than that of shaft 24 to enhance sealing.

Figures 1, 2:
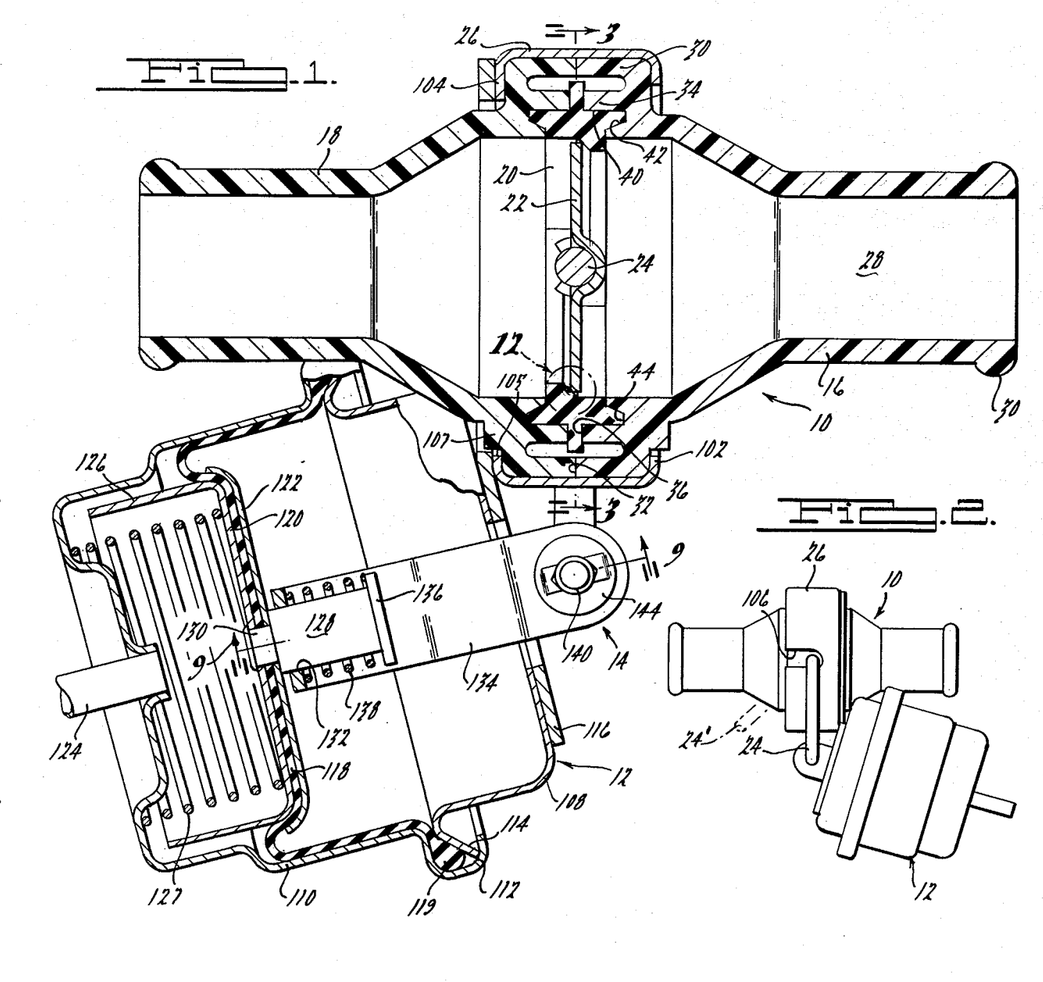
FIG. 1 is a longitudinal sectional view of a vacuum motor powered valve assembly embodying the principles of the present invention.
FIG. 2 is an elevational view of the hidden side of the valve assembly of FIG. 1.

The valve plate and seat element assembly is mounted between body members 16 and 18 in the manner best illustrated in FIG. 1. As can be seen, the axial chamfered ends of valve seat element 20, as defined by chamfered edges 77, are disposed within the grooves defined by walls 40-44 in the respective body members, and bosses 54 and 56 are disposed in the circular openings defined by aligned grooves 45 on the body members. The diameter of these circular openings is slightly less than the outside diameter of bosses 54 and 56 so that upon assembly the body members will tightly pinch and compress the elastomeric material between washers 90, 96 and 100 and the body members to securely hold the washers in place. Transverse positioning of the valve seat element is accomplished primarily by means of the accurate locating of wall 40, and seating of the outside wall 46 of element 20 against wall 40 of the body member is assured by the camming arrangement of each chamfered surface 77 and wall 42, the latter having a lesser angle of inclusion than surface 77 to thereby assure camming of the outside surface of the valve element against the wall of the body member. The relative axial positions of body members 16 and 18 is controlled by the accurate positioning of surfaces 32 on flanges 30. Sealing is accomplished by locating surfaces 36 on flanges 34 so that on assembly they are spaced apart a distance slightly less than the thickness of flange 48 of element 20, whereby flange 48 is sealingly compressed upon assembly of the valve. Flange 48 seals the separate halves of the body from the outside and also the upstream side of the valve seat from the downstream side. The cavity or recess between flanges 30 and 34 provides a space into which the material of flange 48 may expand upon compression.

As noted, the assembly is held together by means of a clinch ring 26, best seen in FIGS. 1 and 2, which extends all the way around the outer periphery of outer flanges 30 and is crimped over the axial ends thereof as at 102 and 104. As can be seen in FIG. 2, clinch ring 26 is provided with an axially extending slot 106 to facilitate assembly over actuating shaft 24. Thus clinch ring 26 in its unassembled condition consists generally of a cylindrical member, preferably a metal stamping or the like, having a slightly interned flange at one end and a notch at the other end. The ring is then slipped over the assembled valve and the unflanged end curled or crimped over the axial end of flange 30 to hold the assembly together, in accordance with known techniques. A notch 105 may be provided in ring 26 for registry with a suitable projection 107 on the body member in order to facilitate alignment during assembly, as shown in FIG. 1.

Vacuum motor 12 comprises generally two casing portions 108 and 110 each preferably formed of sheet metal or the like with casing portion 110 having an outer flange portion 112 folded or crimped over a flange portion 114 on casing portion 108 to rigidly secure the two casing portions together in a generally conventional manner. Vacuum motor 12 may be affixed to the valve 10 by means of a bracket 116 which is attached to casing portion 108 and clinch ring 26 by welding, folded-over tabs, or the like.

Within vacuum motor 12 there is provided a diaphragm 118 having an enlarged bead 119 about the outer periphery thereof which is sealingly compressed between flange portions 112 and 114 to thereby both anchor the diaphragm, seal the inside portions of the motor on opposite sides of the diaphragm from one another, and seal the joint between the casing portions. Diaphragm 118 is formed of a suitable elastomeric material having characteristics which permit it to function in the environment in which it is intended and handle the pressures to which it is likely to be exposed. For the valve in question epichlorohydrin has been found to be a satisfactory material. The center portion of the diaphragm 118 is tightly clamped between a piston 120 on one side and a washer 122 on the opposite side which is contoured to hold the center portion of the diaphragm tightly against the top of the piston. The remaining exposed portions of the diaphragm constitute lobes which are permitted to roll up and down the inside walls of casing portion 110 as the diaphragm and piston move within the motor. The end wall of casing portion 110 is provided with a suitable inlet conduit 124 to which a source of vacuum may be applied. Piston 120 is provided with a cylindrical skirt portion 126 which is of such a length that the piston will engage the end of casing portion 110 (when moved downwardly as seen in FIG. 1) prior to stretching diaphragm 118 past its elastic limit. As a consequence there is no danger of rupturing the diaphragm by virtue of overstretching as a result of the application of an excessive vacuum to the vacuum motor. A compression spring 127 is positioned between piston 120 and the end of casing portion 110 to urge the piston in the opposite direction than that caused by the application of a vacuum. Spring 127 is of sufficient strength to open the valve in the absence of a vacuum, but not so strong that the valve cannot be closed by the vacuum available.

Figure 9:
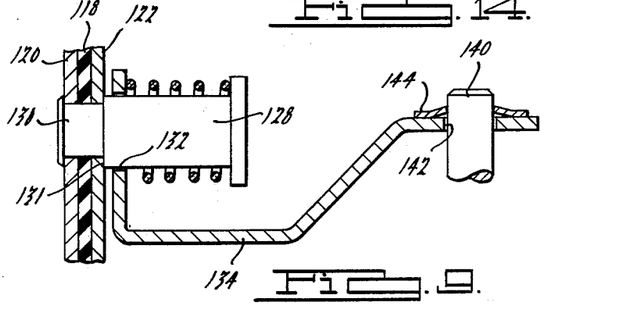
FIG. 9 is a fragmentary sectional view taken along line 9—9 in FIG. 1.

Piston 120, diaphragm 118 and washer 122 are held together by means of a rivet-like element 128 having at one end a reduced diameter projection 130 passing through central apertures in the washer 122, diaphragm 118 and piston 120, the free end of which is deformed to tightly hold the respective parts together against a shoulder 131, as best seen in FIG. 9. The main body portion of element 128 also loosely passes through an opening 132 disposed in one end of a connecting arm 134, as best illustrated in FIGS. 1 and 9. The opposite end of element 128 is provided with an enlarged head 136 and disposed between head 136 and arm 134 is a compression spring 138 which is preloaded to give the minimum force necessary to close the valve. The overall configuration of arm 134 is best illustrated in FIG. 9.

Actuating shaft 24 bends at a right angle after exiting the valve and then a second right angle in the vicinity of the motor, thus having a generally U-shaped configuration. The free end of shaft 24, indicated at 140, passes through a suitable opening 142 in the free end of connecting arm 134 and is held therein by means of a conventional toothed washer 144 which bitingly engages shaft end 140. Casing portion 108 and bracket 116 are provided with suitable aligned openings to permit connecting arm 134 to extend outside the vacuum motor.

In FIG. 1 the valve is shown in its closed position in response to the application of a normal degree of vacuum to vacuum motor 12. In that condition the mechanism is so designed that spring 138 is slightly compressed. The parts are arranged so that the application of excessive vacuum to the vacuum motor will merely compress the spring only slightly further, at which time the piston will bottom on the end of the casing. Thus, the closing force on the valve is at all times controlled by spring 138 and can never exceed a value slightly greater than the preload of the spring. The importance of this can be appreciated when it is realized that the valve must be closeable by 6-7 inches Hg vacuum (a range normally encountered in automobile engine vacuum systems) and yet must not be deformed or damages if the vacuum goes to 24 inches Hg, as does occur. This arrangement also permits the use of much more liberal manufacturing tolerances in the linkage systems. Because the forces are reduced a relatively small diameter actuating shaft may be used, thus reducing bearing friction which tends to cause sticking of the valve.

Movement of the valve to an open position is accomplished by spring 127 when the amount of vacuum supplied to conduit 124 is descresed to the point that it is overcome by spring 127. As can be visualized, if spring 138 is compressed at the time the vacuum is decreased then the initial movement of the piston will result in an expansion of spring 138 to bring connecting arm 134 into contact with washer 122, and further movement of the connecting arm will be in unison with the diaphragm under the influence of spring 127 to pivot valve plate 22 to its open position. The open positions of the actuating shaft is shown in phantom at 24' in FIG. 2. Thus, there is disclosed a normally open butterfly-type valve assembly which is controlled by a single-acting fluid motor, i.e. one which provides powered closing and spring return opening.

As can be seen, each one-half of the valve plate (using shaft 24 as a dividing line) operates on its own respective valve seat and the actual sealing is by virtue of the contact of the corresponding edge of the valve plate and the adjacent conical valve seat. Spring 138 is preferably chosen to provide a closing force which will cause the valve plate sealing edges to actually slightly compress the elastomeric material of which the valve seats are formed. As noted before, the sealing between the elastomeric valve seat element and the valve plate at the opposite sides of the valve plate in the vicinity of the actuating shaft is provided by flat surfaces 68 and 72 which are maintained in compressed sealing engagement with the adjacent portions of the valve plate at all times. This is assured by spacing the flat surfaces on opposite sides of the valve plate so that they have a relaxed separation which is less than the corresponding diameter of the valve plate. Because this sealing area is so close to the pivotal axis of the valve plate the moment arms of the frictional torque created by such sealing engagement are short enough that the effects of friction are minimal.

Figure 13:
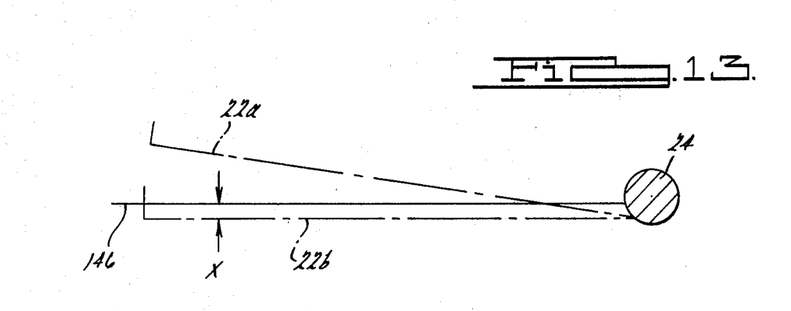
FIG. 13 is a diagrammatic illustration of the manner in which the valve of the present invention closes in a progressive manner.

Not only are the elastomeric valve seats of a configuration and position such that they are slightly compressed by the sealing edge of the valve plate when in the closed position, but in addition the parts are so arranged that the portions of the sealing edges on the valve plate nearest the shaft engage the resilient seats prior to the portions of the edges displaced further from the shaft. This relationship is diagrammatically illustrated in FIG. 13 where line 146 represents the locus of points along a conical valve seat which are progressively engaged by the sealing edge of one-half of the valve plate as it is closed. Another way to visualize this line would be that it is the line of initial contact of one-half of the valve plate with its valve seat. Thus, as can be seen, shaft 24 and/or the pivotal axis thereof is so positioned with respect to the valve seat that when the valve starts to close, as indicated in phantom at 22a, compression of the valve seat is already taking place in the vicinity adjacent the shaft and as the shaft is progressively actuated to close the valve the valve seat is progressively compressed until the valve is fully closed, as represented at 22b in phantom. Dimension X indicates the amount of compression of the valve seat. The advantage of this arrangement is that considerably less actuating force is required to compress the resilient seat and obtain the desired seal. This can be visualized by considering the case where the shaft axis is located at or above the line 146. In that case in order to obtain the compression necessary to provide a good seal between the seat and the portion of the valve plate adjacent the shaft would require excessive downward displacement of the end of the valve plate (i.e. at the left of FIG. 13) into the resilient seat. This would require considerable force because that end of the valve plate is at a maximum moment arm and to cause that portion of the valve plate to sink deeply into the seat would require substantially greater forces than required with applicant's arrangement. Since each half of the valve plate operates in the opposite direction from the other half the thickness of the valve plate and the axial positioning of the conical valve surface is chosen to provide the desired relationship. Furthermore, the fact that the entire actuating shaft and valve plate assembly is essentially floating in an elastomeric material, i.e., element 20, is believed to enhance and facilitate the overall sealing ability of the valve.

In addition to the utilization of a relatively few simple and inexpensive parts, the valve and motor assembly of the present invention is ideally suited to a very simple method of manufacture. The present invention may be readily assembled by first inserting shaft 24, prior to putting any bends therein, into the projections and groove formed on valve plate 22 and thereafter brazing or soldering the assembly together in a furnace or the like. If desired, the parts may be tack welded prior to heating. The shaft 24 may thereafter be bent into the general configuration desired. Since the shaft is bent to a position dictated by its relationship to the plane of the valve plate, bending the shaft after brazing or soldering avoids the need for having a relatively complicated locating fixture in the furnace. If desired for corrosion resistance, the shaft and plate assembly may thereafter be chrome or zinc plated. The shaft and plate assembly is then inserted into the resilient valve seat element 20 by stretching the latter over the ends of the shaft, after which the washers and O-rings constituting the journals and end seals are added at each end. The resulting assembly is then placed between two body members, clinch ring 26 inserted over one end and then crimped into place to tightly secure the body members together. This completes assembly of the entire valve. Unlike certain known valves, there is no need to assemble the shaft and valve plate together inside the valve body, a very difficult operation. If a motor is utilized it may be manufactured in accordance with known techniques and affixed to the clinch ring, either before or after its assembly to the valve.

Figure 12:
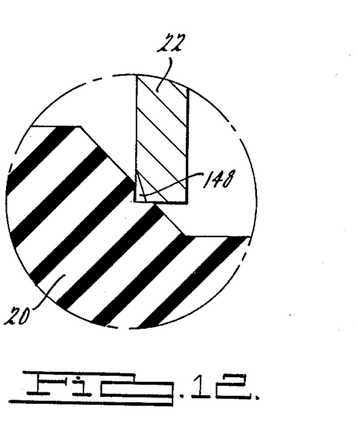
FIG. 12 is an enlarged view of the portion of FIG. 1 indicated by circle 12, illustrating a further modified version of the valve of the present invention.

Although the exemplary valve disclosed is contemplated for use as an on-off valve, if desired it can be slightly modified to provide metering at low flow rates and/or small actuating lever displacements. This can be accomplished by providing one or more small notches or nicks 148 along the sealing edge of the valve plate, as illustrated in FIG. 12. These notches are preferably of such a depth and configuration that when the valve is fully closed and the valve element pressed into the valve seat there is no possibility of leakage, but are close enough to the junction of the valve plate and the valve seat that leakage can occur almost immediately upon any opening movement of the valve plate, as can be readily visualized from FIG. 12. In fact leakage will start to occur as the preload on spring 138 is reduced during initial actuation of shaft 24.

The exemplary valve illustrated is balanced to give good sealing under positive and negative pressures and to reduce opening forces, however if desired it may be made unbalanced in accordance with known practices, such as by moving the pivotal axis of the actuating shaft to a point not equispaced between the planes of the sealing edges and/or to a point not lying on a major diameter of the valve plate.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A fluid valve comprising:
    a body having a longitudinally extending passageway, said body being formed of first and second body members each having a passage aligned with the passage of the other to form said passageway;
    an elastomeric member sealingly disposed between said body members and defining an opening through which passes all the fluid flowing through said passageway;
    a valve element disposed in said passageway for movement to and from a closed position in which said valve element sealingly engages said elastomeric member to block the flow of fluid through said opening;
    actuating means for moving said valve element to and from said closed position; means defining inner and outer annular flange means on each of said first and second body members;
        said outer flange means of said first body member engaging said outer flange means on said second body member to locate said body members with respect to one another,
        said respective inner flange means of said first and second body members being spaced from one another a substantially uniform distance when said body members are assembled with said outer flange means in engagement; and
    flange means integral within said elastomeric member being disposed between said respective inner flange means.

2. A fluid valve as claimed in claim 1 wherein said inner flange means are spaced apart a distance less than the relaxed thickness of said flange means on said elastomeric member, whereby the latter is compressed between said respective inner flange means.

3. A fluid valve as claimed in claim 1 wherein said outer flange means of said first body member is held in engaging relationship with said outer flange means on said second body member by means of an annular clinch ring.

4. A fluid valve as claimed in claim 1 wherein:
    said valve element is mounted for pivotal movement about a transverse axis passing through said member; integrally formed with said elastomeric member are a first valve seat disposed on one transverse and axial side of said axis and a second valve seat disposed on the opposite transverse and axial side of said axis; and each of said seats is generally conical in configuration and faces in the opposite direction as the other said seat, said seats being arranged to sealingly engage the edges of said valve element in said closed position.

5. A fluid valve as claimed in claim 4 wherein:
    said valve element has an actuating shaft affixed thereto for moving said element to and from said closed position, said shaft having journal portions extending outwardly from opposite sides of said valve element; and said elastomeric member has a pair of opposed openings for rotatably supporting said respective journal portions, said journal portions being isolated from said body by said elastomeric member whereby said valve element may float to a limited degree with respect to said body.

6. A fluid valve as recited in claim 5 wherein one of said journal portions of said shaft is disposed within and rotatably supported by annular bearing means, said bearing means disposed in one of said openings in said elastomeric member, and said bearing means being isolated from said body by said elastomeric member whereby said valve element may float to a limited degree with respect to said body.

7. A fluid valve comprising:
a body having a longitudinally extending passageway, said body being formed of first and second body members each having a passage aligned with the passage of the other to form said passageway;
an elastomeric valve seat member sealingly disposed between said body members and defining an opening through which passes all the fluid flowing through said passageway,
said valve seat member having resilient conical valve seats thereon;
a valve element disposed in said passageway for movement to and from a closed position in which said valve element sealingly engages said conical valve seats to block the flow of fluid through said opening,
said valve element being mounted for pivotal movement about an axis transverse to the axis of said passageway;
actuating means for moving said valve element to and from said closed position; an actuating shaft affixed to said valve element for moving said element to and from said closed position,
said shaft having journal portions extending outwardly from opposite sides of said valve element; and
means defining a pair of opposed openings in said elastomeric valve seat member and an annular metal bearing disposed in each of said openings, each of said bearings directly rotatably supporting a journal portion of said shaft, said journal portions, bearings and seats being isolated from said body by said elastomeric valve seat member whereby said valve element may float to a limited degree with respect to said body.

8. A fluid valve as claimed in claim 7, wherein said bearing means includes a generally flat annular member formed of a rigid material and having a centrally disposed opening for rotatably supporting said journal portion.

9. A fluid valve as claimed in claim 8, wherein said annular member has an outside dimension greater than the inside dimension of said opening in said valve seat member in which it is disposed, whereby the portion of said valve seat member surrounding said annular member is compressed to resiliently hold said annular member in place.

10. A fluid valve as claimed in claim 9, further comprising
a second annular member disposed in said one of said openings,
said second annular member having a central opening rotatably supporting said same journal portion of said shaft and being compressedly held in place by said valve seat member, and
O-ring means disposed between said first and second annular members for sealing said shaft with respect to said one of said openings.

11. A fluid valve as claimed in claim 7, further comprising O-ring means disposed about said shaft for sealing said shaft with respect to said one of said openings in said valve seat member.

12. A fluid valve as claimed in claim 11, wherein said O-ring is disposed outside of said bearing means.

13. A fluid valve as claimed in claim 7, further comprising second bearing means disposed in the other of said openings for rotatably supporting the journal portion of said shaft disposed therein.

14. A fluid valve as claimed in claim 7, wherein said shaft directly engages and is supported solely by the elastomeric material of said valve seat member.

* * * * *

UNITED STATES PATENT AND TRADEMARK OFFICE
CERTIFICATE OF CORRECTION

PATENT NO. : 4,111,395
DATED : September 5, 1978
INVENTOR(S) : William L. Sheppard It is certified that error appears in the above-identified patent and that said Letters Patent are hereby corrected as shown below:

Claim 1, column 10, line 38: "within" should be --with--

Signed and Sealed this

Fourth Day of December 1979

[SEAL]

Attest:

SIDNEY A. DIAMOND

Attesting Officer

Commissioner of Patents and Trademarks